(12) United States Patent
Gazier et al.

(10) Patent No.: US 8,204,382 B2
(45) Date of Patent: Jun. 19, 2012

(54) RADIO FREQUENCY-BASED OPTICAL TRANSPORT NETWORK SYSTEMS AND METHODS

(75) Inventors: Michaël Gazier, Ottawa (CA); Phillips T. Salman, Sterling, VA (US); Joseph E. Berthold, Fallston, MD (US)

(73) Assignee: Ciena Corporation, Linthicum, MD (US)

( * ) Notice: Subject to any disclaimer, the term of this patent is extended or adjusted under 35 U.S.C. 154(b) by 634 days.

(21) Appl. No.: 12/402,079

(22) Filed: Mar. 11, 2009

(65) Prior Publication Data

US 2010/0232785 A1 Sep. 16, 2010

(51) Int. Cl.
*H04B 10/00* (2006.01)
(52) U.S. Cl. ........ 398/115; 398/116; 398/117; 398/103; 398/128
(58) Field of Classification Search .................. 398/115, 398/116, 117, 103, 128
See application file for complete search history.

(56) References Cited

U.S. PATENT DOCUMENTS

| | | | |
|---|---|---|---|
| 2006/0168181 A1* | 7/2006 | Somashekhar et al. ........ 709/223 |
| 2007/0091896 A1* | 4/2007 | Liu .............................. 370/395.5 |
| 2008/0037984 A1* | 2/2008 | Perkins et al. ................... 398/43 |
| 2008/0199183 A1* | 8/2008 | Liu et al. ........................ 398/103 |
| 2009/0324227 A1* | 12/2009 | Caggioni et al. ................ 398/79 |

* cited by examiner

*Primary Examiner* — Kinam Park
(74) *Attorney, Agent, or Firm* — Clements Bernard PLLC; Christopher L. Bernard; Lawrence A. Baratta, Jr.

(57) ABSTRACT

The present disclosure provides radio frequency (RF)-based OTN systems and methods. This includes a framework to carry services over RF-based links without using SONET/SDH or asynchronous radio. In an exemplary embodiment, the present disclosure utilizes an OTN framework over RF. Additionally, the present disclosure can also apply to other non-OTN frameworks such as an extended Ethernet frame with forward error correction (FEC) over RF-based links. The present disclosure combines existing OTN FEC with a radio FEC or with an over-the-air FEC to reduce the OTN FEC. Additionally, the present disclosure utilizes unused overhead to communicate RF data rates between radios.

20 Claims, 5 Drawing Sheets

RADIO FREQUENCY-BASED OPTICAL TRANSPORT NETWORK SYSTEMS AND METHODS

FIELD OF THE INVENTION

The present invention relates generally to networking systems and methods. More particularly, the present invention provides radio frequency (RF)-based Optical Transport Network (OTN) systems and methods thereby using RF links to transport a variety of signals over OTN protocols or other protocols.

BACKGROUND OF THE INVENTION

Conventionally, networks utilize a variety of transmission media such as optical fiber, copper, coaxial cable, radio frequency (RF), and the like. Additionally, networks are typically architected with a variety of tiers, such as, for example, copper or coax to a home user, wireless to a mobile user, optical or RF to business, optical for long haul and metro service provider connections, and the like. OTN (Optical Transport Network) is an exemplary encapsulation protocol defined for optical transmission for transparently multiplexing and mapping synchronous and asynchronous client signals.

ITU-T defines OTN as a set of Optical Network Elements connected by optical fiber links, able to provide functionality of transport, multiplexing, switching, management, supervision and survivability of optical channels carrying client signals. ITU Standard G.709 is commonly called Optical Transport Network (OTN) or digital wrapper technology. OTN is currently offered in three rates, OTU1, OTU2, and OTU3, and future rates are expected such as OTU4. OTU1 has a line rate of approximately 2.7 Gb/s and was designed to transport a SONET OC-48 or an SDH STM-16 signal. OTU2 has a line rate of approximately 10.7 Gb/s and was designed to transport an OC-192, STM-64 or 10 Gbit/s WAN. OTU2 can be over-clocked (non-standard) to carry signals faster than STM-64/OC-192 (9.953 Gb/s) like 10 gigabit Ethernet LAN PHY coming from IP/Ethernet switches and routers at a full line rate (approximately 10.3 Gb/s). This is specified in G.Sup43 and called OTU2e. OTU3 has line rate of approximately 43 Gb/s and was designed to transport an OC-768 or STM-256 signal. OTU4 is currently under development to transport future 100 GbE signal.

Of note, OTN is defined in various standards such as: ITU-T G.709 Interfaces for the optical transport network (OTN); ITU-T G.798 Characteristics of optical transport network hierarchy equipment functional blocks; OTN Standard FEC (Called GFEC sometimes) is defined in ITU-T G.975; OTN Jitter is defined in ITU-T G.8251: The control of jitter and wander within the optical transport network (OTN); G.870: Terms and definitions for Optical Transport Networks (OTN); G.871: Framework for optical transport network Recommendations; G.873.1: Optical Transport Network (OTN): Linear protection; G.874: Management aspects of the optical transport network element; G.874.1: Optical transport network (OTN): Protocol-neutral management information model for the network element view; G.959.1: Optical transport network physical layer interfaces; G.8201: Error performance parameters and objectives for multi-operator international paths within the Optical Transport Network (OTN). In addition to the OTN Standard FEC (GFEC), a proprietary FEC could be used.

As networks evolve, capacity is always a foremost concern. This is typically the case at all the tiers in a network. For example, copper is bandwidth limited (typically to below 30 Mb/s), fiber is not in place everywhere and is often very expensive to put in place (e.g., $40 k to $80 k per mile for urban deployment), and currently deployed radio is limited to 10 to 45 Mb/s typically (or less), particularly at the access tier (first hop). Note, one advantage of radio is that radio does not require wiring (i.e., copper, fiber, etc.).

Many current networks are radio based, usually in the 6-38 GHz range. This frequency range is referred to as "microwave" links. Spectrum widths available in this range are usually 5 to 50 MHz, thus limiting data rates even with 256 QAM (Quadrature amplitude modulation) coding. Frequencies below 6 GHz are normally used for access, e.g., from consumer handset terminals to a cell tower. The 6-38 GHz radio links are normally point-to-point for backhaul, as multipoint is normally used for consumer handset access and is exceedingly expensive and complex to license. Today, these 6-38 GHz networks are typically sub 45 Mb/s rate especially for access/metro, with metro rates up to 155 Mb/s and transport rates in the Mb/s range, typically.

However with increasing data rates of access terminals, current deployments need to target access around 45 Mb/s, hence access aggregation requires 150 Mb/s to 1,000 Mb/s and metro scaling to n×400 Mb/s to p×Gb/s (n, p are integers). Higher radio frequency bands are becoming open to deployment, such as the "e-band" frequency band which is typically 71-95 GHz (for example 71 to 86 GHz). This band is called millimeter (mm) wave (i.e., as opposed to microwave). Due to propagation characteristics (oxygen absorption) and licensing, the 70-86 GHz range is more suitable to carrier needs than the 60 GHz area (which is thus used for short unlicensed drops to enterprises, usually). Spectrum widths available (currently licensed) at 70-86 GHz are around 2*5 GHz in width. There are also other bands (such as 40-55 GHz).

As described herein, historically radios were plesiochronous (T1, E1, etc.) or SONET/SDH. Also, network bandwidth and services are shifting away from plesiochronous and SONET/SDH to Ethernet, i.e. Ethernet is becoming the service of choice in network deployments. Thus existing radios are not very well suited to carrying Ethernet, although they can be made to carry Ethernet (e.g., Ethernet over SONET/SDH, for example, using a SONET/SDH radio). What has yet to be investigated is the application of OTN transport over radio frequency links for providing Ethernet transport as well as other services used with OTN.

BRIEF SUMMARY OF THE INVENTION

In various exemplary embodiments, the present invention provides radio frequency (RF)-based Optical Transport Network (OTN) systems and methods thereby using radio links to transport a variety of signals over OTN protocols. The present invention provides a framework to carry services over RF-based links without using SONET/SDH or asynchronous radio. In an exemplary embodiment, the present invention utilizes an OTN framework over RF. Additionally, the present invention can also apply to other non-OTN frameworks such as an extended Ethernet frame with forward error correction (FEC) over RF-based links. The present invention combines existing OTN FEC with a radio FEC or with an over-the-air FEC to reduce the OTN FEC.

In an exemplary embodiment, a radio frequency node includes a protocol multiplexing device configured to multiplex a plurality of client signals into a protocol, wherein the plurality of client signals comprise any of an asynchronous and a synchronous service; and a radio coupled to the protocol multiplexing device, wherein the radio is configured to transmit and receive a modulated radio frequency signal based on the protocol. The protocol includes Optical Transport Network, and the protocol multiplexing device is configured to multiplex the plurality of client signals into one of an Optical channel Transport Unit 1 (OTU1), an Optical channel Transport Unit 2 (OTU2), and a Optical channel Transport Unit 3 (OTU3). Optionally, the radio frequency node is deployed in an existing legacy network comprising Optical Transport Network. The synchronous service can include any of G.8261 synchronous-Ethernet, PDH, SONET, and SDH. The protocol includes Optical Transport Network overhead, the protocol multiplexing device and the radio are configured to utilize unused overhead bytes to communicate a data rate to another radio frequency node. The protocol multiplexing device and the radio can be configured to lock a transmission rate based on the data rate. Optionally, the protocol multiplexing device and the radio are integrated into an existing Optical Transport Network device. The protocol multiplexing device can include circuitry to provide IEEE1588 time stamping. The protocol multiplexing device can include circuitry to provide forward error correction with Optical Transport Network overhead, and the radio can include circuitry to provide radio-based forward error correction. The forward error correction with Optical Transport Network overhead and the radio-based forward error correction are combined for a single forward error correction. The protocol can optionally include Ethernet with an extended frame comprising forward error correction, and the Ethernet can be Carrier Ethernet. The protocol multiplexing device and the radio can include circuitry to interact with Link Capacity Adjustment Scheme to do one of adapt radio bandwidth requirements and to notify availability of actual radio bandwidth. The radio frequency can further include an algorithm configured to operate on the protocol multiplexing device and the radio to read the data rate and then selectively move services from primary tunnels to secondary tunnels on a backup path rather than moving all tunnels on a degraded or failed path.

In another exemplary embodiment, a radio frequency-based Optical Transport Network system includes a protocol multiplexing section interfacing with a plurality of client signals; an Optical Transport Network section interfacing with the protocol multiplexing section; a modem interfacing with the Optical Transport Network section; a Radio Frequency and amplification section interfacing with the modem; and an antenna interfacing with the Radio Frequency and amplification section. The plurality of client signals include any multiple instances of an asynchronous and a synchronous service, wherein the protocol multiplexing section is configured to multiplex the plurality of client signals into one of an Optical channel Transport Unit 1 (OTU1), an Optical channel Transport Unit 2 (OTU2), and a Optical channel Transport Unit 3 (OTU3), and wherein the Optical Transport Network section is configured to process overhead and forward error correction. The antenna can operate in the e-band defined as 60-95 GHz spectrum. The radio frequency-based Optical Transport Network system further includes circuitry in the Optical Transport Network section configured to communicate a data rate with a far end node through unused overhead bytes. The radio frequency-based Optical Transport Network system can be integrated within an existing Optical Transport Network system to provide radio frequency transmission with existing optical transmission.

In yet another exemplary embodiment, a method of using an asynchronous framing structure over a radio frequency link includes multiplexing or mapping one or more client signals into an Optical Transport Network protocol; setting a data rate responsive to the one or more client signals in an unused overhead byte in the Optical Transport Network protocol; transmitting the multiplexed or mapped one or more client signals in Optical Transport Network frames to a far end; and receiving signals from the far end. The method can further include at the far end, adjusting a transmission rate based on the data rate, wherein adjusting includes bit stuffing.

BRIEF DESCRIPTION OF THE DRAWINGS

The present invention is illustrated and described herein with reference to the various drawings, in which like reference numbers denote like system components, respectively, and in which.

DETAILED DESCRIPTION OF THE INVENTION

In various exemplary embodiments, the present invention provides radio frequency (RF)-based OTN systems and methods. The present invention provides a framework to carry services over RF-based links without using SONET/SDH or asynchronous radio. In an exemplary embodiment, the present invention utilizes an OTN framework over RF. Additionally, the present invention can also apply to other non-OTN frameworks such as an extended Ethernet frame with forward error correction (FEC) over RF-based links. The present invention allows combining existing OTN FEC with a radio FEC or with an over-the-air FEC to reduce the OTN FEC, or to reduce the radio FEC, or to provide a larger combined FEC.

The present invention includes an RF node capable of interfacing with a plurality of client signals (Ethernet, SONET/SDH, Fibre Channel, etc.) and providing these client signals over an OTN frame on an RF-based link. The RF node can be configured to lock a radio clock to an incoming signal, such as synchronous Ethernet (e.g., G.8261 series), OTN which in turn includes TDM/SONET/SDH and Ethernet, and the like. The present invention also utilizes spare/unused OTN fields in overhead to communicate current available data rate of the RF link for when FEC steps up and down. Advantageously, this provides an ability to move services to the RF link with knowledge of the existing bandwidth. Also, the present invention can interact with Link Capacity Adjustment Scheme (LCAS) to either adapt bandwidth to requirements or to signal availability from actual bandwidth.

Figure 1:
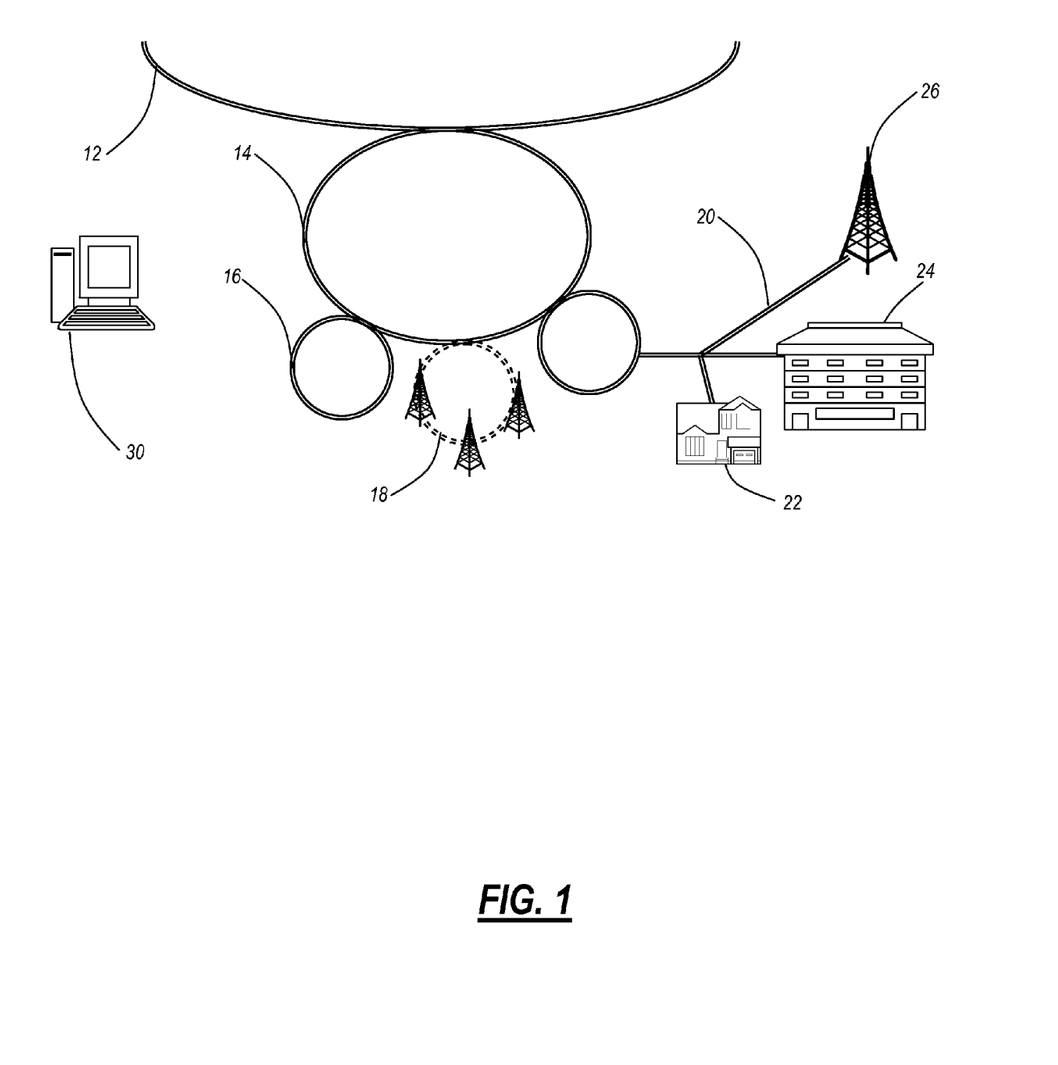
FIG. 1 is a reference network architecture according to an exemplary embodiment of the present invention.

Referring to FIG. 1, reference network architecture 10 is illustrated according to an exemplary embodiment of the present invention. As described herein, the network architecture 10 includes multi-tiers, such as a core network 12, a metro core network 14, a secondary metro network 16, a radio sub-network 18, and an access network 20. The core network 12 generally provides long-haul and/or regional transport at high capacities. For example, the core network 12 can include dense wave division multiplexing (DWDM) systems with SONET/SDH and/or OTN protocols operating at 10 Gb/s, 40 Gb/s, and/or 100 Gb/s.

The metro core network 14 provides regional access at high-to-medium capacities. The metro core network 14 can include DWDM, coarse WDM (CWDM), and the like with SONET/SDH, OTN, and/or direct over wavelength transport (e.g., Ethernet over WDM, Fibre Channel over WDM, and the like). The secondary metro network 16 can provide local access loops, such as to digital loop carriers, coax cable, switches, routers, and the like.

In various exemplary embodiments, the present invention provides RF-based OTN networks, such as in the radio sub-network 18 and in the access network 20, for example. In FIG. 1, the radio sub-network 18 is illustrated in a ring configuration off of the metro core network 14. The access network 20 includes a plurality of access nodes, such as a residence 22, a business 24, and a radio tower 26. Other access node types are also contemplated as are known in the art. The present invention provides OTN-based transmission over the various radio links associated with the radio sub-network 18, the radio tower 26, and the like.

The radio sub-network 18 and the radio tower 26 (communicating point-to-point to another radio tower (not shown)) can utilize any RF band. For example, the e-band (70 GHz and up) is capable of carrying sufficient bandwidth to achieve the required data rates in real network deployments associated with OTN (i.e., higher than 2.6 Gb/s). Also, the 60-70 GHz band can be useful for short reach drops to enterprises, the 6-38 GHz is widely used for backhaul and could be used, and the 40-55 GHz band could also be used, along with any other RF band.

One interesting parameter in the e-band is the large spectrum width allocated which allows data rates with reasonable reach and availability, ranging from 1 Gb/s to over 10 Gb/s, and reaching typically from 1 km to over 5 km, in some geographies to over 15 km. The present invention contemplates utilizing any modulation format to transmit OTN signals over RF links. Of note, the present invention can utilize low complexity encoding (binary phase shift keying (BPSK) to 16-Quadrature amplitude modulation (QAM)) due to the wide spectrum width in the e-band. Other RF bands could utilize more efficient and complex modulation formats to achieve the desired capacity such as, for example, up to 256 QAM. There are also ways to get large data rates in lower bands such as microwave, for example by combining multiple narrower spectrums from several frequencies (various solutions are possible), however normally a single frequency spectrum width at 256 QAM is normally limited to sub 1 Gb/s rates (and may require using 2 polarizations, for example 2×400 Mbps for 800 Mbps).

Each of the network elements (NEs) in the radio sub-network 18 and the radio tower 26 include an RF transceiver and associated modulation and multiplexing equipment. For example, the multiplexing equipment can be configured to provide OTN formatting of a variety of client signals (SONET/SDH, Ethernet, Fibre Channel, etc.). The modulation equipment is configured to format the OTN signal for RF transmission, and the RF transceiver provides RF transmission and reception. In an exemplary embodiment, the NEs can include existing OTN NEs with optical interfaces, and the RF transceiver can be an additional component added to these systems, such as a new line card fitting within an existing NE. Alternatively, the NEs can be stand-alone RF-based NEs with optical interfaces for client signals and the RF transceiver.

The reference network architecture 10 also includes a network management system (NMS) 30. The NMS 30 is coupled to each of the networks 12, 14, 16, 18, 20 through various means, such as a data communications network. Also, the NMS 30 can include multiple systems (e.g., element management systems (EMSs)) with each system handling a specific network 12, 14, 16, 18, 20. Generally, the NMS 30 provides operations, administration, maintenance, and provisioning (OAM&P) functionality for the various networks 12, 14, 16, 18, 20. The present invention contemplates integration of the radio sub-network 18 and the radio tower 26 with the NMS 30.

Figure 2:
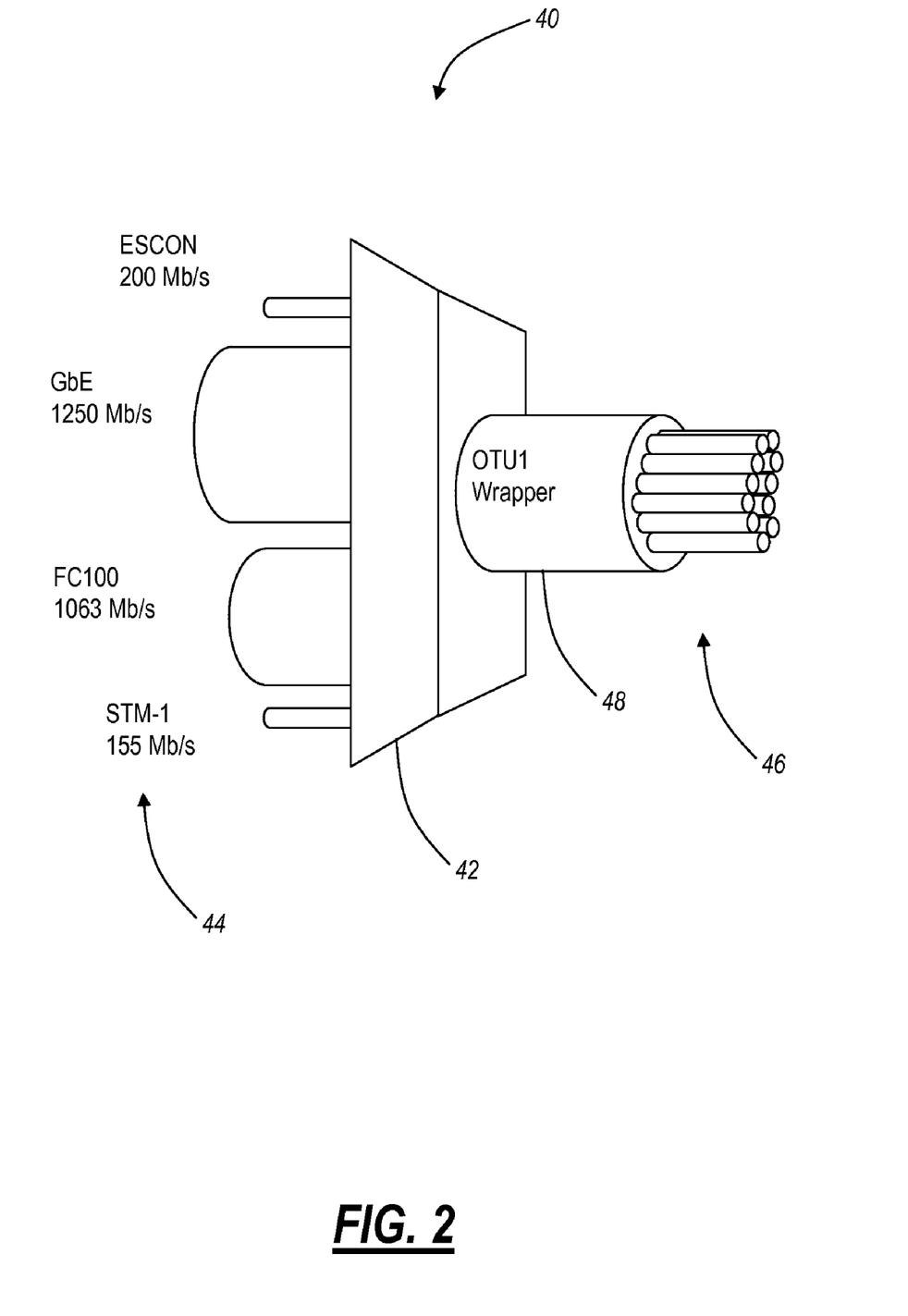
FIG. 2 is an conceptual diagram of a RF node model for transmitting OTN over RF according to an exemplary embodiment of the present invention.

Referring to FIG. 2, an RF node 40 model is illustrated for transmitting OTN over RF with an RF node 40 according to an exemplary embodiment of the present invention. The RF node 40 can be included in the radio sub-network 18, the radio tower 26, and the like. The RF node 40 can be configured to transport a variety of client signals 44, such as ESCON (~200 Mb/s), Gigabit Ethernet GbE (~1250 Mb/s), Fibre Channel FC100 (~1063 Mb/s), and SONET/SDH OC-3/STM-1 (~155 Mb/s), over an RF link as an OTN compliant signal 46. The OTN compliant signal can include an OTU1, OTU2, OTU3 and the like. The RF node 40 includes multiplexing and mapping functionality 42 associated with OTN to format the various client signals 44 into an OTU wrapper 48. The RF node 40 illustrates a conceptual view of mapping various signals into an OTN wrapper such as an OTU-1. This conceptual view can be included in various physical entities. For example, the device that packs the OTU-1 to the radio link could be the radio, possibly also called an RF node. The node could be located at a radio tower. Nodes are always pairs since the radio is point-to-point (or point-to-multipoint) so there is also an end somewhere else.

Advantageously, the RF node 40 fits in legacy networks and offers a smooth transition of slower rate time division multiplexed (TDM) (PDH or SONET/SDH) services to next gen bandwidths. OTN over radio allows maintaining or increasing the TDM service rate and additionally allows adding Ethernet services over an RF link as well as video or other services that can be carried across OTN. The RF node 40 can be configured to provide asynchronous or synchronous service transport, specifically for Ethernet (synchronous being G.8261 series), and specifically for TDM (PDH/SONET/SDH), since all these services can be carried inside the OTN wrapper.

Figure 3:
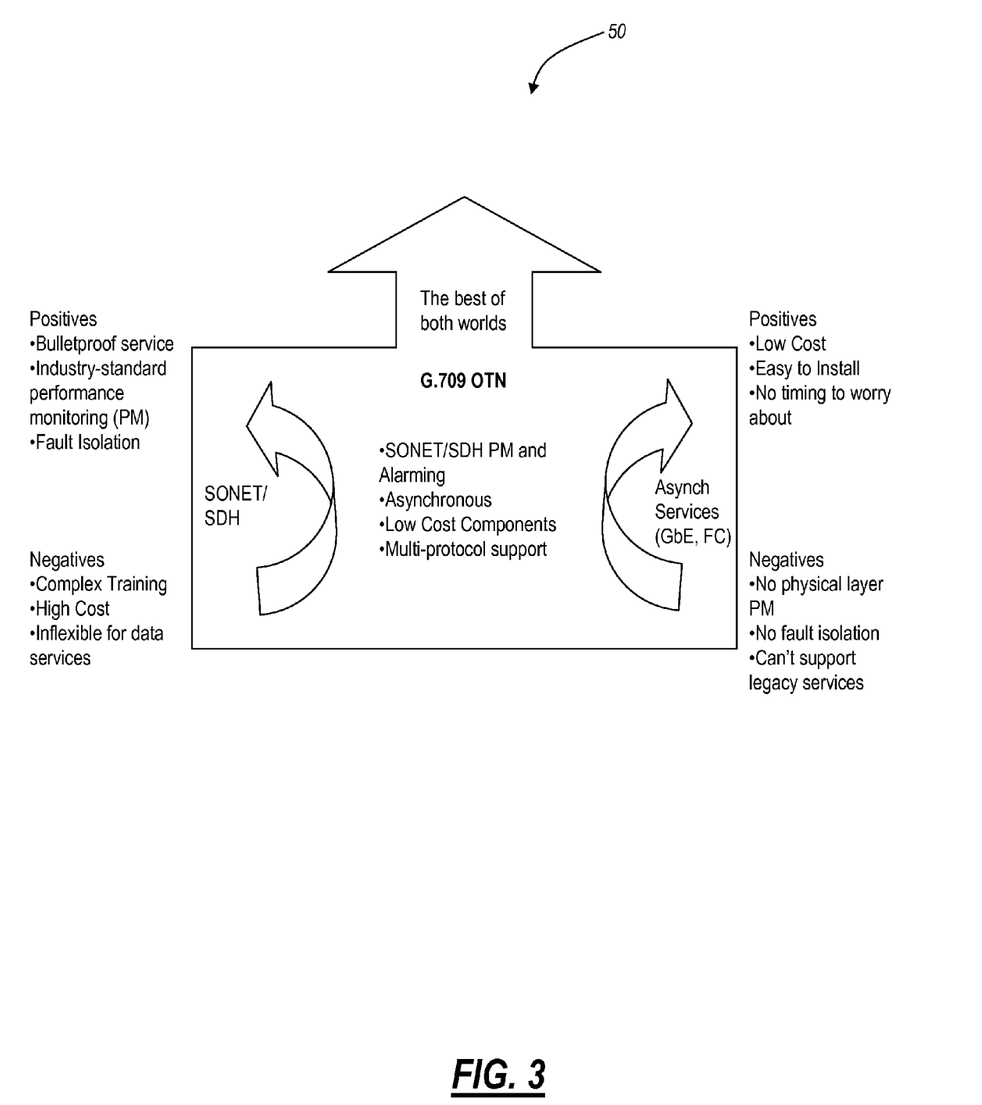
FIG. 3 is a diagram of OTN transport providing carrier-grade transport for RF links according to an exemplary embodiment of the present invention.

Referring to FIG. 3, OTN transport 50 provides carrier-grade transport of asynchronous services along with transparent transport of synchronous services combining benefits of SONET/SDH and asynchronous services. As described herein, existing RF systems utilize either SONET/SDH or are asynchronous. SONET/SDH advantageously provides a reliable service, industry-standard performance monitoring (PM), and convenient fault isolation. Disadvantageously, SONET/SDH requires complex training for personnel, has a higher total cost, and is generally inflexible for transport of data services. OTN maintains the positive characteristics of SONET/SDH but costs less and is simpler to manage.

Asynchronous services (e.g., GbE, FC, etc.) advantageously provide low cost, are easy to install, and do not require timing. However, asynchronous services currently lack physical layer PMs, have no fault isolation, and cannot support legacy services. Thus OTN provides a mixture of SONET/SDH and asynchronous services to provide SONET/SDH-like PMs and alarming without timing (OTN is asynchronous), with low cost components, and with support for multiple protocols including native data services. Thus RF based links using OTN merges the benefits of SONET/SDH and asynchronous services without the limitations.

Figure 4:
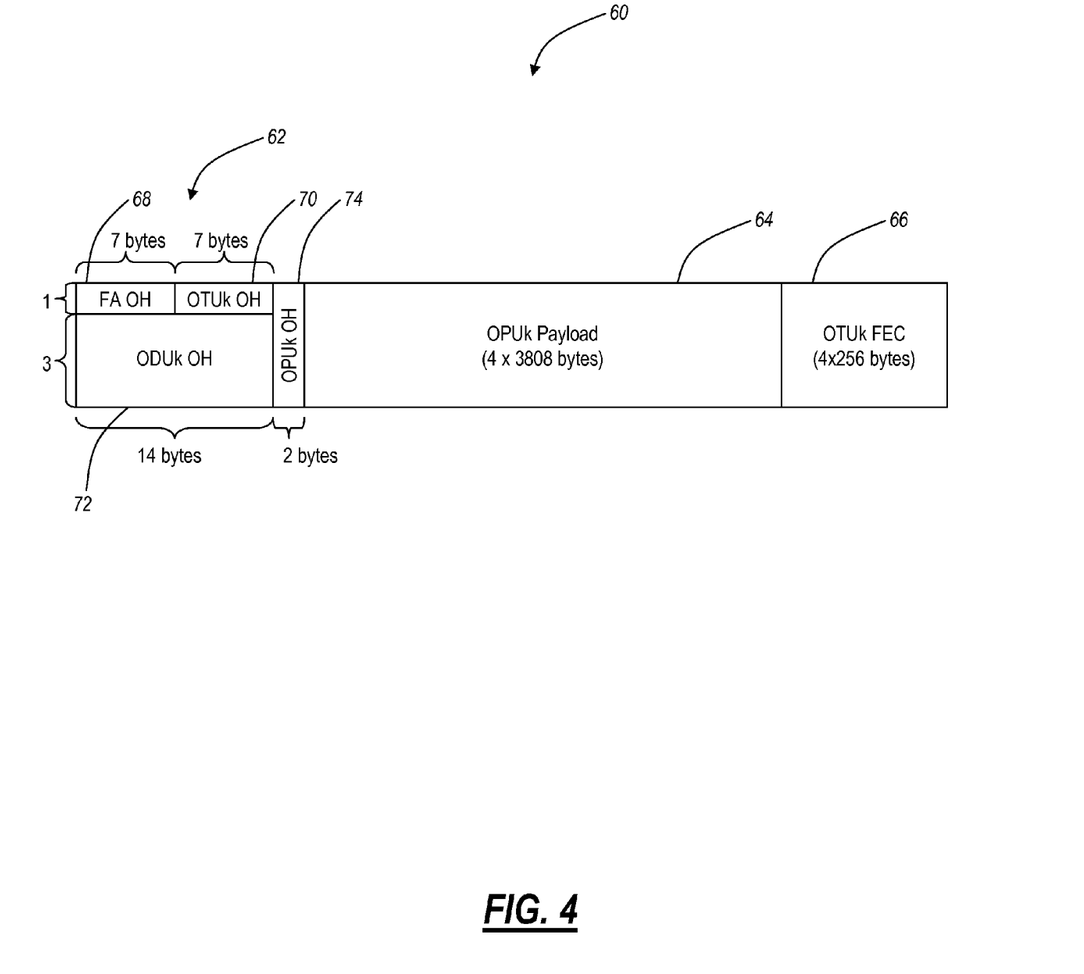
FIG. 4 is a diagram of an OTN frame structure for transmission over RF links according to an exemplary embodiment of the present invention.

Referring to FIG. 4, an OTN frame structure 60 is illustrated for transmission over RF links according to an exemplary embodiment of the present invention. The OTN frame structure 60 is defined in various OTN standards, such as G.709. Generally, the OTN frame structure 60 includes an overhead section 62, a payload section 64, and a forward error correction (FEC) section 66. The overhead section 62 includes standard OTN overhead including a framing alignment section 68, Optical channel Transport Unit k (OTUk) overhead 70, Optical channel Data Unit k (ODUk) overhead 72, and Optical channel Payload Unit k (OPUk) overhead 74. The present invention utilizes the standard OH functions associated with OH 68, 70, 72, 74 in OTN. Additionally, the present invention can utilize unused, reserve, or unspecified bytes in each of the overheads 68, 70, 72, 74 for RF related functions such as communicating a data or line rate between a far end and a near end radio.

The payload section 62 includes client signals such as Ethernet, ATM, SONET/SDH, or generic framing procedure (GFP) protocols. Advantageously, the payload section 62 of OTN is flexible with respect to mapping and multiplexing of client signals and it is this feature that makes OTN a good choice for a transport network as it can carry multiple types of traffic—data, voice, or video—with a common framing structure, while still allowing for service-level guarantees, management, monitoring, and error correction.

The FEC section 66 includes overhead that enables an OTN system to detect and correct line bit errors. The present invention can utilize the standard OTN FEC, i.e. a Reed-Solomon 16 byte-interleaved FEC scheme or an enhanced (proprietary) FEC scheme. RF links used in the present invention can include RF or radio-based FEC. In one exemplary embodiment, the present invention can combine the OTN FEC and the radio FEC as a single FEC to simplify over the air protocols. This could remove the need to have FEC associated with the radio. Also, the present invention can combine the radio and OTN FEC fields can be combined for a larger coding gain.

Figure 5:
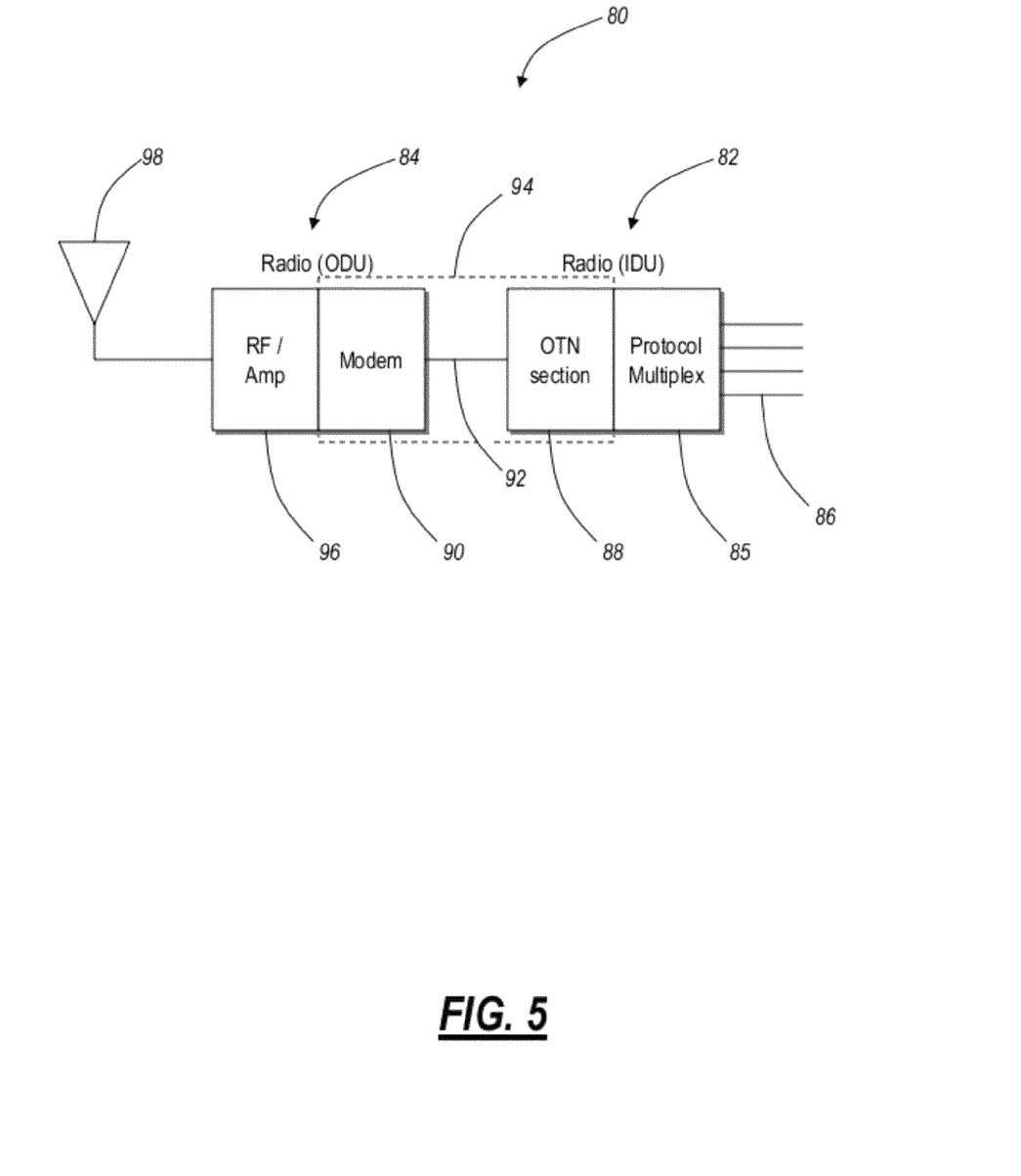
FIG. 5 is a diagram of a radio architecture for the RF node of FIG. 2 according to an exemplary embodiment of the present invention.

Referring to FIG. 5, a radio architecture 80 is illustrated for the RF node 40 according to an exemplary embodiment of the present invention. The radio architecture 80 includes two sections, an indoor unit (IDU) 82 and an outdoor unit (ODU) 84. The IDU 82 is generally located indoors such as in a data room, central office (CO), customer premises (CP), and the like. The ODU 84 is located in an outside location, such as a roof, tower, or the like.

The IDU 82 includes a protocol multiplexer 85 that is connected to a plurality of inputs 86. The plurality of inputs 86 include client signals transmitted and received over a radio link with the RF node 40. Exemplary inputs 86 could include Ethernet, SONET/SDH, Video (ASI, SDI, etc.), Fibre Channel, ESCON, and the like. The RF node 40 can operate with any signal type capable of multiplexing or mapping into OTN frames.

The protocol multiplexer 85 includes circuitry to multiplex and/or map in the transmit direction and to demultiplex and/or demap in the receive direction the plurality of inputs 86 into an OTN format. The protocol multiplexer 85 can include an existing OTN device such as a DWDM network element or the like. In an exemplary embodiment, the protocol multiplexer 85 can multiplex/demultiplex the plurality of inputs 86 into an OTU1 format. The protocol multiplexer 85 can also multiplex/demultiplex to other OTN formats (OTU2, OTU3, etc.).

Generally, OTN does not include a mechanism for multiplexing independent transparent service multiplexing into an ODU1, ODU2, and ODU3. The present invention can utilize an Optical channel Payload Virtual Container (OPVC) as a sub-ODU1 layer for the OTN hierarchy. The OPVC provides a more flexible multiplexing structure than OTN with its standardized minimum granularity of ODU1. The OPVC is described in commonly assigned U.S. Pat. No. 7,443,888, issued Oct. 28, 2008, and entitled "TRANSPARENT SUB-WAVELENGTH NETWORK," and in commonly assigned U.S. patent application Ser. No. 10/956,855, filed Oct. 1, 2004, and entitled "APPARATUS FOR IMPLEMENTING TRANSPARENT SUBWAVELENGTH NETWORKS," the contents of both are incorporated in full by reference herein.

The protocol multiplexer 85 interfaces to an OTN section 88. The OTN section 88 receives a multiplexed OTN signal from the protocol multiplexer 85 and transmits a received OTN signal to the protocol multiplexer 84. In general, the OTN section 88 provides protocol handling associated with OTN. For example, this can include processing overhead, performance monitoring, alarming, FEC, and the like. Additionally, the protocol multiplexer 85 can be configured to interface a data rate to the far end through unused bytes in the OTN overhead.

The IDU 82 communicates to the ODU 84 with the OTN section 88 connected to a modem 90 over an ODU-to-IDU link 92. The ODU-to-IDU link 92 can include an optical fiber connection, coaxial cable connection, or the like. The ODU-to-IDU link 92 transmits and receives an OTU1, OTU2, etc. signal between the OTN section 88 and the modem 90. Optionally, the modem 90 can be included in the IDU 82 or the ODU 84. In general, the OTN section 88 and the modem 90 form a coupled modem/OTN section 94 which is can be a single design (e.g., single circuit pack, etc.) or separate components.

The modem 90 includes circuitry such as digital signal processing (DSP) functionality to adapt a received and transmit OTN based signal for modulation and demodulation over an RF/Amp section 96. The modem 90 is configured to accept an OTN signal (OTU1, OTU2, OTU3, etc.) that is a serial stream of data and modulate/demodulate this over an appropriate RF modulation format. As described herein, there are various modulation formats known in the art. The present invention contemplates use of any modulation format, such as BPSK, QAM, 16 QAM, 256 QAM, and the like.

The RF/Amp section 96 includes RF circuitry and amplification equipment to interface a signal to/from the modem 90 and an antenna 98. The RF circuitry is configured to drive the antenna and the amplification equipment provides power amplification to the signal based on distance requirements. The present invention contemplates adjustable settings with respect to RF power based on specific transmission parameters. For example, the NMS 30 could include graphical user interface (GUI) screens to set up and operate the various components described herein with respect to the RF node 40, such as setting power of the RF/Amp section 96 in response to distance, OTN PM and alarming data (e.g., FEC counts), and the like.

The antenna 98 provides RF transmission and reception of the OTN signal over a predefined RF band. As described herein, the antenna can operate over any of the e-band (70 GHz and up), 60-70 GHz band, the 6-38 GHz, and the 40-55. The antenna 98 is generally configured based on the specific operating band. The antenna 98 is configured to communicate over an RF-link to another antenna 98 in another RF node 40. Optionally, the RF node 40 can include multiple antennas 98 as well for ring or back-to-back configurations.

The RF node 40 can be integrated with a management framework of the NMS 30. Specifically, the NMS 30 (or another EMS with a northbound interface to the NMS 30) can be configured to provide OAM&P functionality for the RF node 40. This can include provisioning of the protocol multiplexer 84, the OTN section 88, the modem 90, the RF/amp 96, and the antenna 98.

The RF node 40 can be configured to transport synchronous Ethernet or the like directly across the RF link. Specifically, the RF node 40 is configured to lock to a rate of an input signal (e.g., a received signal at the antenna 98 or based on the plurality of client signals 86) and to transmit OTN frames at that locked rate over the air. The transmission can include bit stuffing to adapt to the exact radio's rate, which would effectively be equivalent to a locked clock. For example, the OTN section 88 and/or the protocol multiplexer 85 could include bit stuffing circuitry to adapt the rate based on the locked rate. In effect, there are two RF nodes 40 for each RF link, i.e. a far end and a near end. With this rate locking, the far end's egress bit rate to be the same as the near end radio's ingress rate. Thus a synchronous Ethernet signal can be properly carried across the air as synchronous.

Thus OTN is carried across the air transparently with a layer one radio, i.e. the RF node 40, and the signals inside the OTN frame (such as Ethernet, SONET/SDH, and the like) are carried in the OTN frame asynchronously. Accordingly, the layer one radio is not required to modify the rate. Thus synchronous content remains synchronous and asynchronous content remains asynchronous. This functionality can include some clock compensation circuitry in the RF node 40. The rate locking is responsive, i.e. related, to the data rate. For example, assume the data rate is synchronous GbE, if the over the air is GbE+FEC, and the RF node 40 adds x % of overhead for the radio overhead, then the lock is related to rate of synchronous GbE*overhead (accounting for FEC and x % radio overhead). If the GbE rate goes up 0.1% then the over the air rate goes up 0.1%.

In effect, the RF node with a layer one radio is transparent to the signals 86 and it is possible to upgrade an existing radio PDH/SONET/SDH link (or copper or cable link or even fiber link) with a radio OTN link and have no impact on the existing structure, be it point-to-point or rings or chains. However, the newly upgrade radio OTN link has additional capacity and is Ethernet (or other OTN transported protocols) favorable, i.e. the existing traffic is carried over OTN plus new traffic such as Ethernet.

Advantageously, the RF node 40 has very large value to carriers since it is both fully interoperable with existing networks, and allows both new capacity and new protocol transport. In addition it is an extension of current metro WDM fiber networks such as those deployed using the Ciena CN4200 product (available from the Assignee, Ciena Corp. of Linthicum, Md.). This brings extended value of OTN from the metro into the radio portions of the network at the access. It also allows closing fiber rings or meshes with OTN-over-radio hops that might otherwise (without radio) be prohibitively expensive to deploy, such as due to high cabling costs.

Additionally, the use of OTN across the RF link with the RF node 40 allows the use of IEEE 1588v2, NTPv4, or G.8261 synchronous-ethernet, or other similar clock methods to be operated since it does not affect content. Note, the RF node 40 can be conceptually divided between a layer one radio, i.e. the modem 90, RF/amp 96, and antenna 98, with integrated switching equipment, i.e. the protocol multiplexer 85 and the OTN section 88. The integrated switching equipment can be configured to provide the timing functionalities described herein, such as IEEE 1588 (v2 or other) capable. Accordingly, the RF node 40 can be configured to construct a complete IEEE 1588-compliant network since the switching equipment can do the IEEE 1588 time stamping as required for "transparent clocks" (see IEEE1588v2 standard).

The RF node 40 can provide Carrier Ethernet (CE) across the RF link since OTN is one way to enable Carrier Ethernet. Carrier Ethernet generally includes a Data Plane for Ethernet network & services and a Management Plane for Ethernet OAM. For example, the RF node 40 can support a scalable data plane: IEEE 802.1ad (PB), 802.1ah (PBB), 802.1Qay (PBB-TE); interoperable peering: MEF UNI/ENNI, OIF UNI/ENNI; standard service definitions: MEF 10.1, MEF 6.1 (MEF Services); reliability: ITU G.8031 (Linear)/G.8032 (Ring); QoS: MEF 10.1 (Ingress/Egress Bandwidth profile, Performance Attributes); Protocol for Link Management: IEEE 802.3—Clause 57 (802.3ah EFM OAM); Protocol for Link Layer Discovery: IEEE 8021.AB (LLDP); Protocol for Connectivity Fault Management: IEEE 802.1ag; Protocol for UNI-C configuration: MEF 16 (ELMI); Protocol for Performance Management: ITU Y.1731 Ethernet OAM; Service OAM & Interoperable FM/PM: MEF SOAM IA; and NE EMS/NMS: MEF 7, MEF 15 and ITU Q.840.1.

OTN has been described herein as one exemplary embodiment of providing transport over RF links. The present invention also contemplates other framing mechanisms with the RF node 40. For example, the RF node 40 can be configured to transport native Ethernet frames (e.g., GbE, 10 GbE, etc.) with an extended frame adding FEC. These Ethernet frames can be configured as Carrier Ethernet to provide Ethernet OAM.

The RF node 40 also can have the ability to interact with LCAS to either a) adapt radio bandwidth to requirements (or alternatively allocated OTN bandwidth in a radio carrying OTN); or b) notify availability of actual radio bandwidth to the carried traffic via LCAS (for an adaptive bandwidth radio).

As described herein, the OTN overhead can include a field (e.g., in an unused OH position) to signify the current RF data rate. The present invention can further include a mechanism in the RF node 40 that reads this new field, and then selectively move services from a primary Provider Backbone Bridge Traffic Engineering (PBB-TE) or Multi Protocol Label Switching (MPLS) (and variants including VPLS and T-MPLS and MPLS-TP and H) tunnels to secondary tunnels on a backup path rather than moving all tunnels on a degraded or failed path. Selection of services to be moved could be based on 802.1p priority, lowest first (or alternatively a reverse backpack algorithm for selection). This ties OTN/radios/PBB-TE+MPLS (and variants) as an integrated entity and use resources more efficiently to provide unique differentiation to the RF node 40.

Accordingly, the present invention couples OTN (OTU1, OTU2, etc.) or equivalent sub- or super-set (e.g., one subset being: Ethernet+FEC+other overhead) with a radio to offer high capacity multiservice transport over radio links, that is able to carry many synchronous and asynchronous legacy and next gen service types across a single link. This allows smooth transition of link upgrade since legacy service is carried transparently over the new RF link.

The RF node 40 and the radio architecture 80 described herein can be a stand-alone network element. Alternatively, these devices can be integrated into existing optical equipment, such as DWDM systems, optical cross-connects, data switches and routers, and the like. For example, an existing DWDM system could include a new line card for supporting the RF modem and amplification with a link to an ODU at an outside location. Advantageously, this could leverage existing OTN protocol multiplexing associated with the DWDM system (or the like) while added RF capabilities.

In an exemplary embodiment, the RF node 40 and the radio architecture 80 can be integrated in data switches and routers to enable a campus network or a metro network for an enterprise without requiring the laying of optical fiber significantly lowering deployment costs.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A non-transitory radio frequency node, comprising:
    a protocol multiplexing device configured to multiplex a plurality of client signals into a protocol, wherein the plurality of client signals comprise any of an asynchronous and a synchronous service; and
    a radio coupled to the protocol multiplexing device, wherein the radio is configured to transmit and receive a modulated radio frequency signal based on the protocol.

2. The radio frequency node of claim 1, wherein the protocol comprises Optical Transport Network, and wherein the protocol multiplexing device is configured to multiplex the plurality of client signals into one of an Optical channel Transport Unit 1 (OTU1), an Optical channel Transport Unit 2 (OTU2), and a Optical channel Transport Unit 3 (OTU3).

3. The radio frequency node of claim 2, wherein the radio frequency node is deployed in an existing legacy network comprising Optical Transport Network.

4. The radio frequency node of claim 2, wherein the synchronous service comprises any of G.8261 synchronous-Ethernet, PDH, SONET, and SDH.

5. The radio frequency node of claim 2, wherein the protocol comprises Optical Transport Network overhead, wherein the protocol multiplexing device and the radio are configured to utilize unused overhead bytes to communicate a data rate to another radio frequency node.

6. The radio frequency node of claim 5, wherein the protocol multiplexing device and the radio are configured to lock a transmission rate based on the data rate.

7. The radio frequency node of claim 2, wherein the protocol multiplexing device and the radio are integrated into an existing Optical Transport Network device.

8. The radio frequency node of claim 2, wherein the protocol multiplexing device comprises circuitry to provide IEEE1588 time stamping.

9. The radio frequency node of claim 2, wherein the protocol multiplexing device comprises circuitry to provide forward error correction with Optical Transport Network overhead, and wherein the radio comprises circuitry to provide radio-based forward error correction.

10. The radio frequency node of claim 9, wherein the forward error correction with Optical Transport Network overhead and the radio-based forward error correction are combined for a single forward error correction.

11. The radio frequency node of claim 1, wherein the protocol comprises Ethernet with an extended frame comprising forward error correction, and wherein the Ethernet comprises Carrier Ethernet.

12. The radio frequency node of claim 2, wherein the protocol multiplexing device and the radio comprise circuitry to interact with Link Capacity Adjustment Scheme to do one of adapt radio bandwidth requirements and to notify availability of actual radio bandwidth.

13. The radio frequency node of claim 5, further comprising an algorithm configured to operate on the protocol multiplexing device and the radio to read the data rate and then selectively move services from primary tunnels to secondary tunnels on a backup path rather than moving all tunnels on a degraded or failed path.

14. A non-transitory radio frequency-based Optical Transport Network system, comprising:
    a protocol multiplexing section interfacing with a plurality of client signals;
    an Optical Transport Network section interfacing with the protocol multiplexing section;
    a modem interfacing with the Optical Transport Network section;
    a Radio Frequency and amplification section interfacing with the modem; and
    an antenna interfacing with the Radio Frequency and amplification section.

15. The radio frequency-based Optical Transport Network system of claim 14, wherein the plurality of client signals comprise any multiple instances of an asynchronous and a synchronous service, wherein the protocol multiplexing section is configured to multiplex the plurality of client signals into one of an Optical channel Transport Unit 1 (OTU1), an Optical channel Transport Unit 2 (OTU2), and a Optical channel Transport Unit 3 (OTU3), and wherein the Optical Transport Network section is configured to process overhead and forward error correction.

16. The radio frequency-based Optical Transport Network system of claim 14, wherein the antenna operates in the e-band defined as 60-95 GHz spectrum.

17. The radio frequency-based Optical Transport Network system of claim 14, further comprising circuitry in the Optical Transport Network section configured to communicate a data rate with a far end node through unused overhead bytes.

18. The radio frequency-based Optical Transport Network system of claim 14, wherein the radio frequency-based Optical Transport Network system is integrated within an existing Optical Transport Network system to provide radio frequency transmission with existing optical transmission.

19. A method of using an asynchronous framing structure over a radio frequency link, comprising:
    multiplexing or mapping one or more client signals into an Optical Transport Network protocol;
    setting a data rate responsive to the one or more client signals in an unused overhead byte in the Optical Transport Network protocol;
    transmitting the multiplexed or mapped one or more client signals in Optical Transport Network frames to a far end over the radio frequency link; and
    receiving signals from the far end over the radio frequency link.

20. The method of claim 19, further comprising:
    at the far end, adjusting a transmission rate based on the data rate, wherein adjusting comprises bit stuffing.

* * * * *